UNITED STATES PATENT OFFICE.

MAX DITTMAR, OF WÜLFEL, NEAR HANOVER, GERMANY.

MANUFACTURE OF PHOSPHORIC ACID.

1,018,746.  Specification of Letters Patent.  Patented Feb. 27, 1912.

No Drawing.  Application filed November 3, 1910. Serial No. 590,504.

*To all whom it may concern:*

Be it known that I, MAX DITTMAR, a subject of the German Emperor, and residing at Wülfel, near Hanover, Germany, have invented certain new and useful Improvements in the Manufacture of Phosphoric Acid, of which the following is a specification.

According to my invention phosphoric acid is obtained in a high degree of purity by mixing a phosphate of an alkali metal or of an alkaline earth metal with hydrochloric acid or hydrofluoric acid in excess, according as the chlorid or the fluorid of the metal is insoluble in hydrochloric acid or hydrofluoric acid respectively, whereupon the metal is precipitated as an insoluble chlorid or fluorid, the phosphoric acid being liberated and remaining in solution so that it can be separated by filtration. For example, if sodium phosphate or barium phosphate be mixed with the theoretically necessary proportion of hydrochloric acid of 24–40 per cent. strength, the chlorid of the metal is precipitated and can be separated from the solution in a suitable manner. The solution is then evaporated until its specific gravity is from 1.3 to 1.5, at which point a further separation of chlorid takes place which chlorid is separated by filtering.

In order to precipitate from the concentrated solution the last portion of the metal as chlorid, hydrogen chlorid is conducted into the solution until a filtered sample thereof no longer gives a precipitate of sodium chlorid or barium chlorid, when mixed with a mixture of ether and alcohol. The filtered solution yields a pure phosphoric acid after the excess of hydrochloric acid has been separated by heating. Potassium and ammonium phosphate behave similarly, but the phosphoric acid obtained still contains from 2 to 3 per cent. of alkali so that it is not quite pure, although applicable for many technical purposes.

In the case of the phosphates or superphosphates of the alkaline earths, for example calcium or magnesium phosphate, excess of hydrofluoric acid is used instead of excess of hydrochloric acid. The phosphate is subjected to the action of hydrofluoric acid, from which any sulfuric acid it may contain has been previously removed by addition of barium carbonate, until a sample of the filtered liquid, containing from 10 to 20 per cent. of phosphoric acid, yields no precipitate on addition of ammonia. Generally about 5 per cent. more hydrofluoric acid than is theoretically necessary must be used. When the reaction is finished the resultant fluorid is separated from the mixture by filtering, the excess of hydrofluoric acid being expelled from the filtrate to obtain a pure phosphoric acid.

The separated fluorid contains the iron and aluminum which may have been present in the form of impurities in the phosphate; it may be employed for the manufacture of hydrofluoric acid to be used for repeating the process with further quantities of phosphate.

The advantage of this invention is that it permits the manufacture of pure phosphoric acid economically. As is well known, hitherto the pure acid was prepared exclusively by the combustion of phosphorus, other processes, such as the decomposition of calcium phosphate by means of sulfuric acid having resulted in the production of crude phosphoric acid. The pure phosphoric acid is used as an article of consumption and for the preparation of peroxid of hydrogen, for which purpose the crude phosphoric acid cannot be used, inasmuch as the iron and aluminum salts contained therein impart to the same an unpleasant taste and, moreover, make it impossible to separate the same by rapid decantation after the decomposition of barium peroxid. In fact, in manufacturing hydrogen peroxid, the chemically pure acid is exclusively employed, although its price is about six times that of the crude phosphoric acid containing the same percentage of the pure acid.

From the above it will be noted that my invention consists in reacting upon a phosphate of a metal capable of forming alkaline compounds, under which designation are comprehended the alkali-metals and the alkaline earth metals, with a halogen acid which will form with the metal employed a halogen compound insoluble in the acid. The alkaline earth metals for the purpose of this invention are to be considered the equivalent of the alkali-metals.

Having now particularly described and ascertained the nature of my said invention and in what manner the same is to be performed, I declare that what I claim is:

1. The process of making phosphoric acid which consists in reacting upon the phosphate of a metal forming compounds having alkaline properties with a halogen acid forming halogen compounds with the metal which are insoluble in the acid until the halogen compound is precipitated.

2. The process of making phosphoric acid which consists in reacting upon an alkali metal phosphate with hydrochloric acid until the chlorid of the alkali metal is precipitated.

3. The process of preparing phosphoric acid which consists in reacting upon the phosphate of a metal forming alkaline compounds with hydrochloric acid until the chlorid of the metal is precipitated, then separating the solution and evaporating the same, and again removing the precipitated chlorid and, finally, conducting hydrochloric acid into the solution until a filtered sample of the same gives no further precipitate when mixed with ether or alcohol.

4. In the art of making phosphoric acid, the process which consists in reacting upon the phosphate of a metal forming compound having alkaline properties with a concentrated halogen acid forming halogen compounds with the metal which are insoluble in the acid until the halogen compound is precipitated.

5. In the art of making phosphoric acid, the process which consists in reacting upon an alkali metal phosphate with hydrochloric acid of substantially from 24 to 40 per cent. strength.

Dated this 13th day of October 1910.

In testimony whereof I affix my signature in presence of two witnesses.

MAX DITTMAR.

Witnesses:
J. M. BOWCOCK,
ROBERT V. BÜLOW.